US011275916B1

(12) United States Patent
Costello et al.

(10) Patent No.: US 11,275,916 B1
(45) Date of Patent: Mar. 15, 2022

(54) METHODS AND A DEVICE FOR PROCESSOR OPTIMIZATIONS DURING ITEM SCANNING AND TRANSACTION PROCESSING

(71) Applicant: NCR Corporation, Atlanta, GA (US)

(72) Inventors: Christopher John Costello, Suwanee, GA (US); Si Ha, Atlanta, GA (US); Steve Pixton, Douglasville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/005,644

(22) Filed: Aug. 28, 2020

(51) Int. Cl.
*G06K 7/14* (2006.01)
*G06F 9/48* (2006.01)
*G06Q 20/20* (2012.01)

(52) U.S. Cl.
CPC ........... *G06K 7/1439* (2013.01); *G06F 9/485* (2013.01); *G06K 7/1417* (2013.01); *G06Q 20/208* (2013.01)

(58) Field of Classification Search
CPC .... G06Q 20/208; G06F 9/485; G06K 7/1417; G06K 7/1439
USPC ....................................................... 235/462.1
See application file for complete search history.

(56) References Cited

U.S. PATENT DOCUMENTS

2013/0183952 A1* 7/2013 Davis .................... G06T 1/0064
455/418
2018/0063394 A1* 3/2018 Crooks .............. H04N 21/4223

* cited by examiner

*Primary Examiner* — Toan C Ly
(74) *Attorney, Agent, or Firm* — Schwegman, Lundberg & Woessner

(57) ABSTRACT

Processor utilization for a combined transaction terminal and scanner device is controlled during item code image capture, item code reading, and/or read item code communications. Item image capture rates, item image frame reads, and read item code communications are controlled to override preconfigured processing and to reduce processor utilization on the device. This frees up processor capacity for performing other operations during transactions on the device.

16 Claims, 3 Drawing Sheets

METHODS AND A DEVICE FOR PROCESSOR OPTIMIZATIONS DURING ITEM SCANNING AND TRANSACTION PROCESSING

BACKGROUND

Typically, a transaction terminal is a specialized device configured to interface with peripherals necessary to perform transactions (e.g., item checkouts). One such peripheral is a scanner, which is designed to read item barcodes that pass over an item reader. Item barcodes are captured as images and then translated into item codes. The scanner can capture the item barcode images at rates of approximately 40 frames per second (fps). Furthermore, a scanner can have multiple cameras or imaging sensors, such that a scanner with two imaging sensors captures 80 barcode images in a single second; a scanner with three imagining sensors captures 120 barcode images in a second; etc.

There are also different types of item codes embedded in the captured item images, some are one-dimensional (1D—such as traditional barcodes having lines of varying widths and spacing between the lines), others can be two-dimensional (2D—such as Quick Response (QR) codes—geometric patterns using dots and other shapes), and some are integrated as colored dots throughout the surface of an item within the item's packaging (e.g., DIGIMARC®). Each type requires very different translation or conversion processes to derive the item codes from the item images. Some scanners may not be able to even recognize DIGIMARC® codes, QR codes, or colored item codes.

Furthermore, when scanners are peripheral devices to the transaction terminal a great deal of communication and synchronization is needed between the two devices during a transaction.

As a result, a composite device was recently introduced in the industry, which integrates both scanner and transaction terminal hardware onto a same motherboard of a single device. This created a more processing efficient and space efficient device, which was specialized for reading item codes and performing item checkouts during transactions and which made communication and synchronization easier to manage and to control. However, since both the scanner and transaction terminal share the same hardware, it is important that hardware resources be freed when not in use or when not needed by the scanner software or the terminal software to ensure that the processor of the composite device does not become overly taxed and ensure that the processor has the capacity to focus on immediate or higher priority tasks.

Moreover, features and functions of both scanners and transaction terminals continue to exponentially grow in the industry, which complicates peripheral scanner-based checkout systems and composite scanner/transaction terminal-based systems. For example, a plethora of computer vision-based applications are regularly being added within the industry to checkout system (for real-time fraud detection, item recognition, etc.); these applications necessitate a substantial amount of image processing and can substantially slow the processing throughput during checkouts.

Accordingly, there is a need to improve scanner and transaction terminal communication and synchronization for purposes of improving and managing transaction throughput during a checkout such that new features and functions of checkout systems can be efficiently integrated.

SUMMARY

In various embodiments, methods and a device for processor optimizations during item scanning and transaction processing are presented.

According to an embodiment, a method for processor optimizations during item scanning and transaction processing is presented. As an example, first operations that are associated with item code processing on a device are throttled down during a transaction. A freed processor utilization for a processor of the device that is released by the throttling is acquired by a second operation during the transaction.

DETAILED DESCRIPTION

Figure 1:
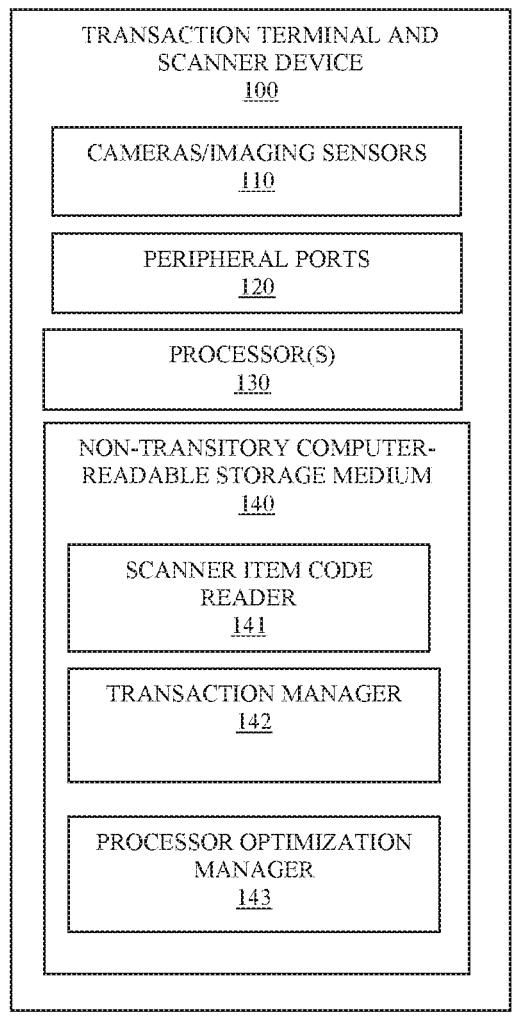
FIG. 1 is a diagram of a device for processor optimizations during item scanning and transaction processing, according to an example embodiment.

FIG. 1 is a diagram of a device 100 for processor optimizations during item scanning and transaction processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of processor optimizations during item scanning and transaction processing presented herein and below.

The device 100 is a composite device that integrates the hardware and software of both a scanner and a transaction terminal into a single motherboard of a single device. In an embodiment, hardware associated with cameras and a weigh scale are on a separate Printed Circuit Board (PCB) that is attached to the motherboard.

In an embodiment, device 100 is a modified version and enhanced version of a composite device that comprises both scanner and transaction terminal hardware integrated into a same motherboard as a single device (modified and enhanced in the manners discussed herein and below).

As will be discussed in greater detail herein and below, processor optimizations during transactions are performed by controlling capture and retention of item code image frames used for item code reading, controlling when read item codes are sent for further downstream transaction processing, controlling resource priorities, and/or controlling when cameras/imaging sensors 110 are turned on and off.

Device 100 comprises a plurality of integrated cameras/imaging sensors 110, a plurality of peripheral ports 120, one or more processors 130, and a non-transitory computer-readable storage medium 140. Medium 140 comprises executable instructions for scanner item code reader 141, transaction manager 142, and processor optimization manager 143. When the executable instructions are executed by processor 130 from medium 140, this causes processor 130 to perform operations associated with scanner item code reader 141, transaction manager 142, and processor optimization manager 143 (as discussed below with 141-143).

Cameras/imaging sensors 110 capture images of items and item barcodes at a predefined frame rate (fps). The images are streamed at the predefined fps into a buffer. Scanner item code reader 141 processes the images from the buffer to read item codes for the images, the item codes read (translated from image format to text format) are sent to transaction manager 142. Transaction manager 142 uses the item codes to lookup item details and item pricing (using a network connection between device 100 and a server) during transaction pricing.

It is to be noted that as used herein transaction manager 142 includes peripheral management and transaction management processes, such that transaction manager 142 is intended to be all system software processes associated with a transaction terminal and its transaction processing. Therefore, transaction manager 142 is not just item code lookup and transaction workflow processing but includes device driver interaction with peripherals attached to ports 120 and with the integrated scanner of device 100 represented by imaging sensors 110 and scanner item code reader 141.

Processor optimization manager 143 monitors the above-noted processing on device 100 to optimize processor 130 utilization and control processor 130 utilization. Specifically, and in an embodiment, processor optimization manager 143 monitors when 2D or DIGIMARC® item codes are read. Customers or operators of terminal 100 do not experience delays and are satisfied with transaction throughput and responsiveness when 1D item codes are processed at 40 fps. However, for 2D and DIGIMARC® item codes, customer or operator expectations are less than 40 fps.

This means that when 2D and DIGIMARC® item barcodes are read by scanner item code reader 141, processor optimization manager 143 can intervene and throttle the corresponding item barcode reading to achieve a reduction in continuous processor 130 utilization. Processor optimization manager 143 instructs scanner item code reader 141 to skip frames, for example read 20 of the 40 frames returned in a second. This can be done by sending a "pause" command to scanner item code reader 141. The timing of sending "pause" and "resume" commands can be controlled by processor optimization manager 143. By pausing item code reader 141, optimization manager 143 is able to cause frames to be skipped and alter the rate in which item codes are read per second. Essentially, the predefined fps are altered by controlling when item code reader 141 is actively processing and reading item codes from the item code images in the buffer. This allows the rate to be controlled at a set frequency to keep an interval between processing the frames constant. The constant interval can change as processor load changes. This can be proportional to processor load as processor utilization increases, the delay between frames increases.

Other aspects of processing besides or in addition to pausing reader 141 can also be used to free up processor 130 utilization during transaction processing on device 100. For example, imagining sensors 110 can be turned on and off, item code reader 141 can be instructed not to send read item codes to transaction manager 142.

In an embodiment, processor optimization manager 143 operates at an application level of authority within the operating system (OS) of device/terminal 100. This ensures that scanner item code reader 141 will still read a scanned operational or configuring code (to put the device in an administrative mode of operation, change an operational setting, etc.), since such configuring code would be issued at an administrative level of authority within the OS for device 100.

As mentioned above, processor optimization manager 143 may also turn one or more cameras/imaging sensors 110 on and off thereby preventing scanner item code reader 141 from reading item codes at its configured rate, such as 40 fps. Processor optimization manager 143 may give imaging sensors 110 priority when they are turned back on. For example, for 450 milliseconds (ms) imaging sensors 110 are turned off during which time another application processing on device 100 is able to process images already reside in the buffer from the imagining sensors 110, such as a computer-vision application that is processing for security or fraud detection in real time at device 100 during a checkout.

As mentioned above, processor optimization manager 143 may also instruct scanner item code reader 141 to stop sending read barcodes to transaction manager 142 in order to free up processor 130 utilization during a transaction. That is, as each frame of an item code is read, it is sent to transaction manager 142 for processing but if item code reader 141 only sends every other read item code or every fifth read item code, transaction manager 143 is not processing received read item codes, which reduces processor 130 utilization.

Processor optimization manager 143 may obtain task processor 130 utilization through the OS's existing process task Application Programming Interface (API) utility. This permits manager 143 to identify current processor 130 utilization and task/process identifiers (ids) along with each task/process id's current processor 130 utilization (a task id associated with item code reader 141 and transaction manager 142).

Customized rules may be enforced by manager 143 to make decisions as to when to reduce the capturing of item codes in the buffer (by selectively turning off and on one or more of the imagining sensors 110), selectively pausing item code reader 141, and/or selectively instructing item code reader 141 to not send item codes read by item code reader 141 to transaction manager 142. The rules can include the length of time during which sensors 110 are turned off, a pause is in place for item code reader 141, and a do not send read item code is issued for item code reader 141.

It is to be noted, a typical item that is captured in an image by sensors 110 has at least 40 images per second (40 fps) and there is at least 3 cameras capturing the images for a total of 120 images of one item in one second. As a result, by not processing every frame in each second, there is little chance of any degradation in quality or item recognition by device 100. However, by selectively forcing some frames to be not captured, not read, or not sent to transaction manager 142 a significant amount of processor 130 utilization can be freed up for other applications that need to be processed during the transaction, such as computer-vision applications used for fraud and security.

Typically, when a read item code is sent to transaction manager 142 from item code reader 141, transaction manager 142 sends back a command that disables item code reader 141 from sending any additional item codes read for that item. In this case, further processor 130 utilization can be freed up by optimization manager 143 issuing a pause command to item code reader 141, which pauses item code reader 141 from reading the remaining frames for the already acknowledged item code of the item. Again, optimization manager 143 may also stagger pauses to only continue reading some of the remaining frames for the already acknowledged read item.

Imaging sensors 110 and item code reader 141 are continuously pinging processor 130 during a transaction on device 100 because at least 40 frame images of a single item are buffered and then each frame is attempted to be read (translated or converted from image format to text format representing an item code value) and each read item code sent to transaction manager 142. This taxes processor 130 especially when it is considered that typically there may be anywhere from 3 (120 frames or images of the item) to 8 (320 frames or images of the item) imaging sensors 110 integrated into the motherboard of device 100. Optimization manager 143 evaluates in real time the type of item codes being read and the processor 130 utilization for device 100. Optimization manager 143 may then enforce some default processor optimizations rules for 2D item codes and DIGIMARC® item codes, these default rules reduce the number of frames captured (by selectively turning sensors 110 on and off), reduce the number of item codes read from the frames (by sending "pause" and "resume" commands to item code reader 141), and/or reduce the number of read item codes sent to transaction manager 143 (by sending a disable or do not send command to item code reader 141).

It is noted that other scanning technologies may be used with the embodiments presented herein besides those referenced herein with respect to 1D barcodes, 2D barcodes, and DIGIMARC® codes. Thus, embodiments presented herein can work with any scanning-based technology associated with capturing item codes.

As mentioned above, the default rules may be overridden or changed through customized rules, which are dynamically enforced by optimization manager 143.

In an embodiment, device 100 is a Point-Of-Sale (POS) terminal operated by a clerk during a customer-assisted checkout.

In an embodiment, device 100 is a Self-Service Terminal (SST) operated by a customer during a self-checkout.

These and other embodiments are now discussed with reference to FIGS. 2-3.

Figure 2:
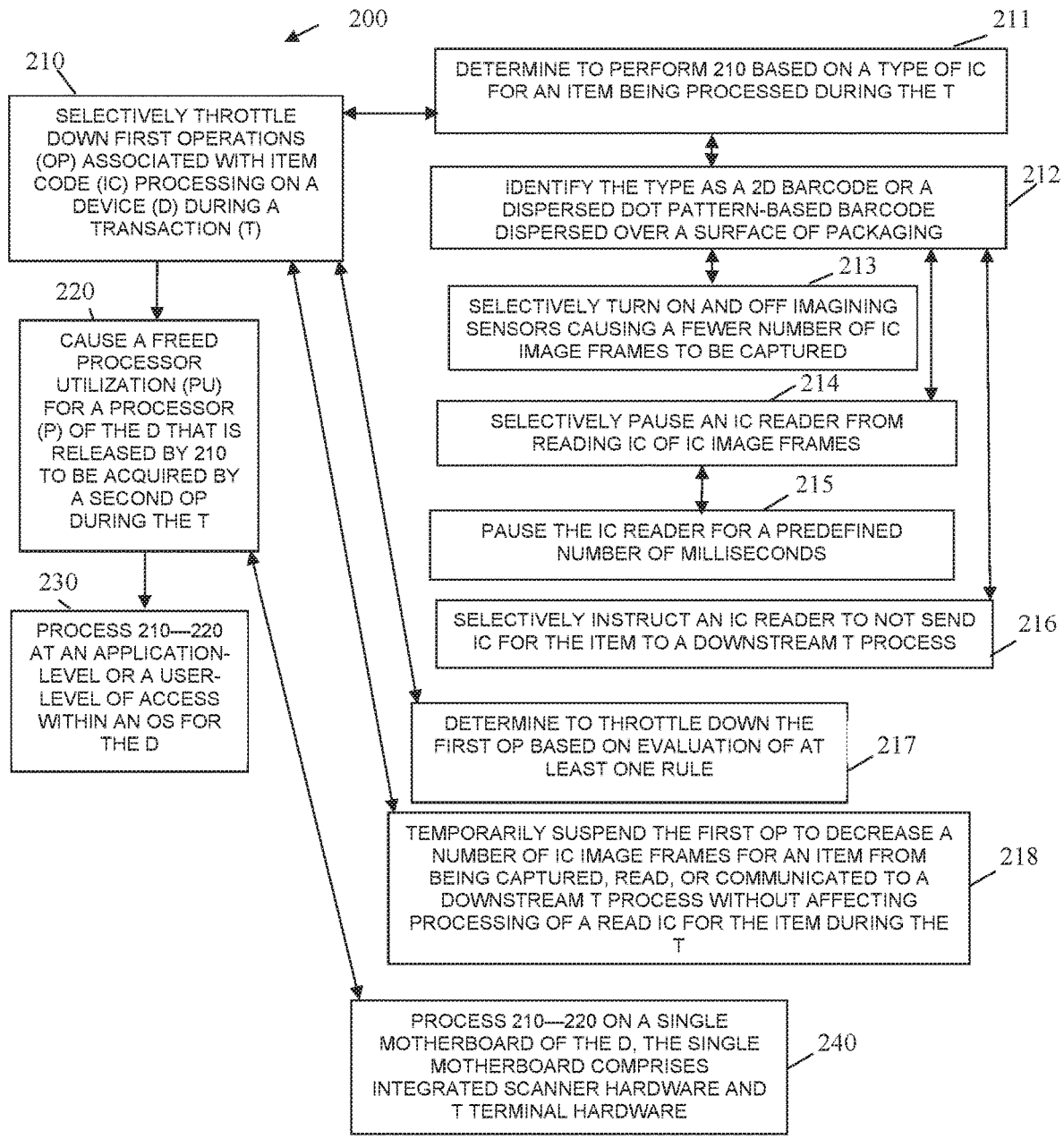
FIG. 2 is a diagram of a method for processor optimizations during item scanning and transaction processing, according to an example embodiment.

FIG. 2 is a diagram of a method 200 for processor optimizations during item scanning and transaction processing, according to an example embodiment. The software module(s) that implements the method 200 is referred to as a "device processor utilization optimizer." The device processor utilization optimizer is implemented as executable instructions programmed and residing within memory and/or a non-transitory computer-readable (processor-readable) storage medium and executed by one or more processors of a device. The processor(s) of the device that executes the device processor utilization optimizer are specifically configured and programmed to process the device processor utilization optimizer. The device processor utilization optimizer may have access to one or more network connections during its processing. The network connections can be wired, wireless, or a combination of wired and wireless.

In an embodiment, the device that executes the device processor utilization optimizer is transaction terminal and scanner device 100.

In an embodiment, the device processor utilization optimizer is all of or some combination of 141-143.

At 210, the device processor utilization optimizer selectively throttles down first operations associated with item code processing on a device during a transaction on the device.

In an embodiment, the device is a composite device that includes scanner hardware and transaction hardware on a same and a single motherboard of the device.

In an embodiment, at 211, the device processor utilization optimizer determines to perform 210 based on a type of item code for an item being processed during the transaction.

In an embodiment of 211 and at 212, the device processor utilization optimizer identifies the type as a 2D (two-dimensional) barcode or a dispersed dot pattern-based barcode that is dispersed over a surface of an item within the packaging of the item (e.g., DIGIMARC®).

In an embodiment of 212 and at 213, the device processor utilization optimizer selectively turns one or more imagining sensors on and off causing a fewer number of item code image frames to be captured for a given item being processed during the transaction. This results in the freed processor utilization for a processor of the device (discussed at 220 below).

In an embodiment of 212 and at 214, the device processor utilization optimizer selectively pauses and resumes an item code reader from reading item codes from item code image frames captured for a given item of the transaction by one or more imagining sensors of the device. This results in the freed processor utilization for the processor of the device.

In an embodiment of 212 and at 215, the device processor utilization optimizer pauses the item code reader for a predefined number of milliseconds resulting in the freed processor utilization for the processor during those milliseconds during which the item code reader is paused.

In an embodiment of 212 and at 216, the device processor utilization optimizer selectively instructs an item code reader of the device to not send read item codes for the item to a downstream transaction process (transaction terminal system and application processes).

In an embodiment, the device processor utilization optimizer can process one of, some combination of, or all of the embodiments of 213, 214, 215, and/or 216.

In an embodiment, at 217, the device processor utilization optimizer determines to throttle down the first operations based on evaluation of at least one rule. The rule can be customized, and the rule may identify which of or which combination of embodiments 213, 214, 215, and/or 216 to throttle as the first operations. So, the rule can identify a condition for which the throttle is to be initiated as well as the first operations for which the throttle is to occur.

In an embodiment, at 218, the device processor utilization optimizer temporarily suspends the first operations to decrease a number of item code image frames for an item from being captured, read, and/or communicated to a downstream transaction process without affecting processing of a read item code for a given item during the transaction.

At 220, the device processor utilization optimizer causes freed processor utilization for a processor of the device that is released by the throttling down at 210 to be acquired by or assigned to a second operation during the transaction. In an embodiment, the second operation is associated with a computer vision-based process being processed for item security during the transaction.

In an embodiment, at 230, the device processor utilization optimizer is processed at an application-level or user-level of access within an OS for the device. In this manner any code presented associated with configuring the device will still override the device processor utilization optimizer and be processed on the device because such configuration utilities are processed at an administrative-level of access within the OS. That is, any system process requiring codes to be read and processed for the device still operates in a normal manner.

In an embodiment, at 240, the device processor utilization optimizer executes and is processed on a single motherboard of the device. The single motherboard comprises integrated scanner hardware and transaction terminal hardware.

Figure 3:
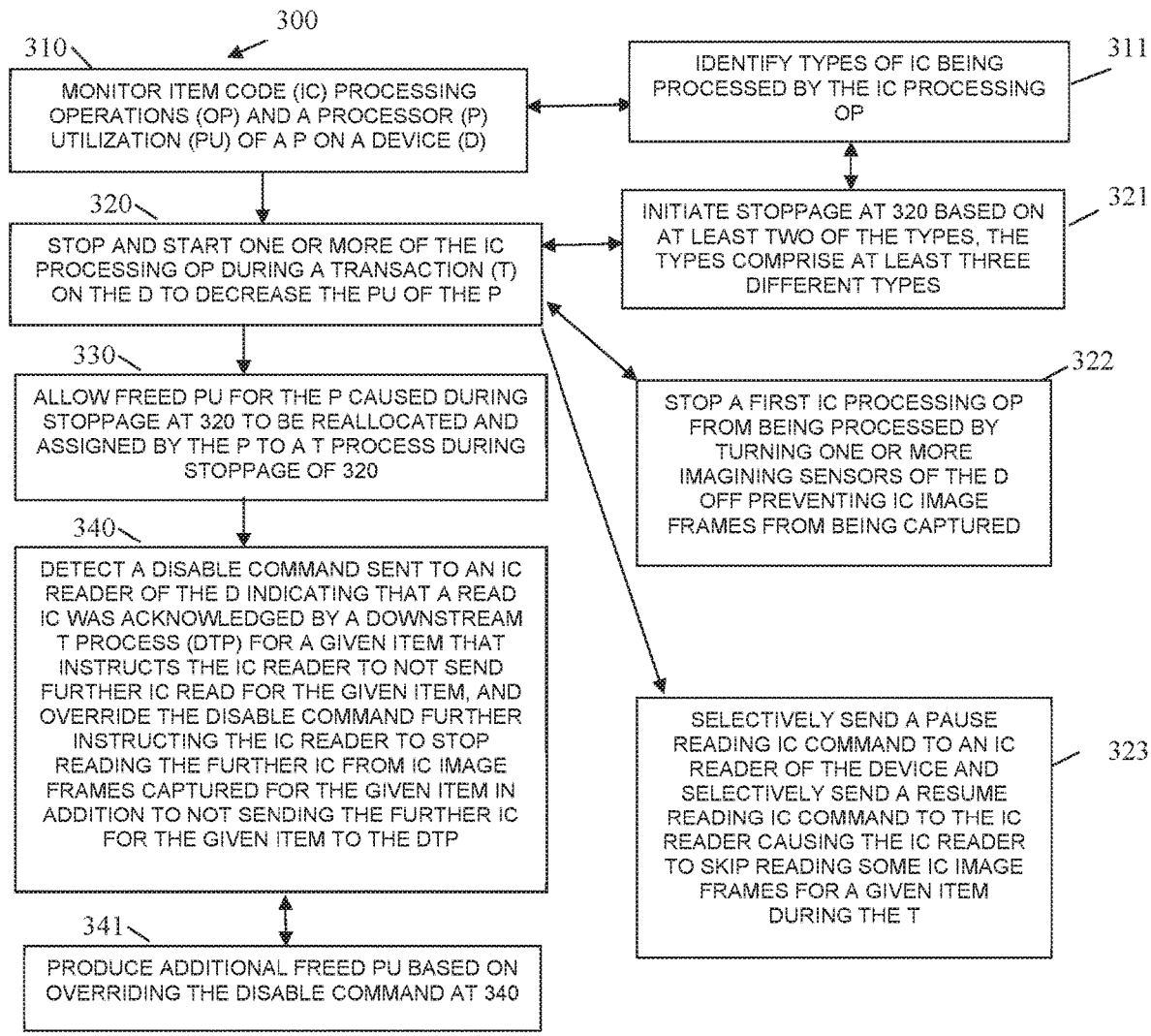
FIG. 3 is a diagram of another method for processor optimizations during item scanning and transaction processing, according to an example embodiment.

FIG. 3 is a diagram of another method 300 for processor optimizations during item scanning and transaction processing, according to an example embodiment. The software module(s) that implements the method 300 is referred to as a "processor utilization controller." The processor utilization controller is implemented as executable instructions programmed and residing within memory and/or a non-transitory computer-readable (processor-readable) storage medium and executed by one or more processors of a device. The processors that execute the processor utilization controller are specifically configured and programmed to process the processor utilization controller. The processor utilization controller may have access to one or more network connections during its processing. The network connections can be wired, wireless, or a combination of wired and wireless.

In an embodiment, the device that executes the processor utilization controller is the transaction terminal and scanner device 100.

In an embodiment, the processor utilization controller is all or some combination of 141-143 and/or the method 200.

The processor utilization controller presents another and, in some ways, enhanced processing perspective to that which was described above with the FIG. 2 and the method 200.

At 310, the processor utilization controller monitors item code processing operations and a processor utilization of a processor on a device.

In an embodiment, at 311, the processor utilization controller identifies types of item codes being processed by the item code processing operations.

At 320, the processor utilization controller selectively stops and starts one or more of the item code processing operations during a transaction on the device to decrease processor utilization for the processor.

In an embodiment of 311 and 320, at 321, the processor utilization controller initiates stoppage at 320 based on at least two types of item codes; the types of item codes comprise at least three different types for the item codes. In an embodiment, the three types comprise 1D barcodes, 2D barcodes, and DIGIMARC® barcodes. The two types for which pauses or skips are processed are associated with 2D barcodes and DIGIMARC® barcodes.

In an embodiment, at 322, the processor utilization controller stops a first item code processing operations from being processed by turning one or more imagining sensors of the device off preventing item code image frames from being captured during the period for which the corresponding imagining sensors are turned off.

In an embodiment, at 323, the processor utilization controller selectively sends a pause reading command to an item code reader of the device and selectively sends a resume reading command to the item code reader, which causes the item code reader to skip reading some of the item code image frames for a given item during the transaction.

At 330, the processor utilization controller allows a freed processor utilization for the processor that is caused by 320 to be reallocated and assigned by the processor to a transaction process during the stoppage at 320.

In an embodiment, at 340, the processor utilization controller detects a disable command sent to an image code reader of the device indicating that a read item code was acknowledged by a downstream transaction process for a given item. This instructs the item code reader to not send further item codes that are read for the given item to the downstream transaction process. The processor utilization controller then overrides the disable command and further instructs the item code reader to pause reading the further item codes from the item code image frames captured for the given item in addition to not sending the further item codes for the given item to the downstream transaction process.

In an embodiment of 340 and at 341, the processor utilization controller produces additional feed processor utilization for the processor based on overriding the disable command at 340.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   selectively throttling down first operations associated with item code processing on a device during a transaction, wherein selectively throttling further includes:
     determining to perform the selectively throttling based on a type of item code for an item being processed during the transaction;
     wherein determining further includes identifying the type as a two-dimensional barcode or a dispersed dot pattern-based barcode dispersed over a surface of the item and represented in the packaging for the item; and
     wherein identifying further includes selectively turning on and off one or more imaging sensors causing a fewer number of item code image frames to be captured resulting in the freed processor utilization when the one or more imaging sensors are off; and
   causing a freed processor utilization for a processor of the device that is released by the selectively throttling to be acquired by a second operation during the transaction.

2. The method of claim 1, wherein identifying further includes selectively pausing an item code reader from reading item codes of item code image frames resulting in the freed processor utilization.

3. The method of claim 2, wherein selectively pausing further includes pausing the item code reader for a predefined number of milliseconds.

4. The method of claim 1, wherein identifying further includes selectively instructing an item code reader to not send read item codes to a downstream transaction process resulting in the freed processor utilization.

5. The method of claim 1, wherein selectively throttling further includes determining to throttle down the first operations based on evaluation of at least one rule.

6. The method of claim 1, wherein selectively throttling further includes temporarily suspending the first operations to decrease a number of item code image frames for an item from being captured, read, or communicated to a downstream transaction process without affecting processing of a read item code for the item during the transaction.

7. The method of claim 1 further comprising, processing the method at an application-level or a user-level of access within an Operating System (OS) for the device.

8. The method of claim 1 further comprising, processing the method on a single motherboard of the device, wherein the single motherboard comprises integrated scanner hardware and transaction terminal hardware.

9. A method, comprising:
monitoring item code processing operations and a processor utilization of a processor on a combined scanner and transaction terminal device (device);
stopping and starting one or more of the item code processing operations during a transaction on the device to decrease the processor utilization of the processor;
allowing feed processor utilization for the processor caused during the stopping to be reallocated and assigned by the processor to a transaction process during the stopping;
detecting a disable command sent to an item code reader of the device indicating that a read item code was acknowledged by a downstream transaction process for a given item that instructs the item code reader to not send further item codes read for the given item, and overriding the disable command further instructing the item code reader to stop reading the further item codes from item code image frames captured for the given item in addition to not sending the further item codes read for the given item to the downstream transaction process.

10. The method of claim 9, wherein detecting further includes producing additional freed processor based on the overriding of the disable command.

11. The method of claim 9, wherein monitoring further includes identifying types of item codes being processed by the item code processing operations.

12. The method of claim 11, wherein stopping and starting further includes initiate the stopping based on at least two of the types being identified, wherein the types comprise at least three different types.

13. The method of claim 9, wherein stopping and starting further includes stopping a first item code processing operation from being processed by turning one or more imagining sensors of the device off preventing item code image frames from being captured.

14. The method of claim 9, wherein stopping and starting further includes selectively sending a pause reading item codes command to an item code reader of the device and selectively sending a resume reading item codes command to the item code reader causing the item code reader to skip reading some item code image frames for a given item during the transaction.

15. A device, comprising:
imagining sensors configured to capture item code image frames for items;
a processor;
a non-transitory computer-readable storage medium comprising executable instructions for a processor optimization manager, an item code reader, and a downstream transaction process;
the processor optimization manager executed by the processor from the non-transitory computer-readable storage medium causing the processor to perform first operations comprising: monitoring item code image frames captured by the imaging sensors that corresponding to a given item during a transaction on the device;
monitoring read item codes produced by the item code reader from the item code image frames that correspond to the given item;
monitoring sent read item codes sent by the item code reader to the downstream transaction process for the given item; and
performing one of more of the following to decrease a processor utilization of the processor during the transaction and create a freed processor utilization for the processor during the transaction for allocation to a transaction process during the transaction:
selectively turning on and off one or more of the imaging sensors during capture of the item code image frames that correspond to the given item;
selectively sending pause and resume commands to the item code reader as the item code reader translates the item code image frames for the given item into the read item codes for the given item causing the item code reader to skip reading some of the item code image frames for the given item; and
selectively sending a do-not-send command to the item code reader causing the item code reader to not send some of the read item codes for the given item to the transaction process;
the item code reader executed by the processor from the non-transitory computer-readable storage medium causing the processor to perform second operations comprising:
translating or converting the item code image frames captured by the imagining sensors for the given item from an image format into a text format as the read item codes;
sending the read item codes to the transaction process;
pausing and resuming the translating or the converting based on receiving the pause and resume commands from the processor optimization manager; and
stopping the sending of read item codes to the transaction process based on receiving the do-not-send command from the processor optimization manager; and
the downstream transaction process executed by the processor from the non-transitory computer-readable storage medium causing the processor to perform third operations comprising:
managing read item codes received from the item code reader for the given item during the transaction; and
interacting with the transaction process and other transaction processes to: 1) obtain item details for the given item and an item price for the given item based on one of the read item codes for the given item, 2) perform security operations for the transaction or the given item, and 3) process transaction payment to complete the transaction on the device.

16. The device of claim 15, wherein the device is a Point-Of-Sale (POS) terminal or a Self-Service Terminal (SST).

\* \* \* \* \*